(12) United States Patent
Logvinov

(10) Patent No.: US 12,148,004 B2
(45) Date of Patent: Nov. 19, 2024

(54) METHOD AND SYSTEM FOR DELIVERY OF A TARGETED ADVERTISEMENT BY AN ELECTRIC VEHICLE CHARGING APPARATUS

(71) Applicant: IoTecha Corp., Cranbury, NJ (US)

(72) Inventor: Oleg Logvinov, Jersey City, NJ (US)

(73) Assignee: IoTecha Corp., Piscataway, NJ (US)

( * ) Notice: Subject to any disclaimer, the term of this patent is extended or adjusted under 35 U.S.C. 154(b) by 375 days.

(21) Appl. No.: 15/863,206

(22) Filed: Jan. 5, 2018

(65) Prior Publication Data

US 2019/0130451 A1 May 2, 2019

Related U.S. Application Data

(60) Provisional application No. 62/578,759, filed on Oct. 30, 2017.

(51) Int. Cl.
*G06Q 30/0251* (2023.01)
*G06Q 20/06* (2012.01)
(Continued)

(52) U.S. Cl.
CPC ....... *G06Q 30/0268* (2013.01); *G06Q 20/065* (2013.01); *G06Q 20/18* (2013.01); *G06Q 30/0241* (2013.01); *G06Q 30/0267* (2013.01); *G06Q 30/0272* (2013.01); *G06Q 30/0274* (2013.01); *G06Q 50/06* (2013.01);
(Continued)

(58) Field of Classification Search
CPC .. G06Q 30/0268; G06Q 20/065; G06Q 20/18; G06Q 30/0241; G06Q 30/0267; G06Q 30/0272; G06Q 30/0274; G06Q 50/06; G06Q 50/01; G06Q 30/0251; G06Q 30/0269; G06Q 50/60; G06Q 50/30; G07F 9/023; G07F 15/005; G07F 17/16;
(Continued)

(56) References Cited

U.S. PATENT DOCUMENTS 8,912,753 B2 12/2014 Pudar et al.
9,277,526 B2 3/2016 Qiu et al.
(Continued)

FOREIGN PATENT DOCUMENTS

BR PI1104705 A2 8/2013
CN 105912618 A 8/2016
(Continued)

OTHER PUBLICATIONS

Giacomo Parenti, Fostering electric mobility in Florence , Sep. 1, 2016, IEEE, (Year: 2016).*
(Continued)

*Primary Examiner* — Arthur Duran
(74) *Attorney, Agent, or Firm* — NK Patent Law

(57) ABSTRACT

System, apparatus and method may control charging a battery of one or more mobile energy storage and power consumption devices, such as installed on electric vehicles (EVs), and delivering a targeted advertisement, provided over a communication network, at an EV charging apparatus selected for charging the battery of the mobile energy storage and power consumption device of an EV, or by a software application on a computing device of an EV user which may perform functions of a process for EV charging.

22 Claims, 5 Drawing Sheets

(51) Int. Cl.
| | |
|---|---|
| *G06Q 20/18* | (2012.01) |
| *G06Q 30/0241* | (2023.01) |
| *G06Q 30/0272* | (2023.01) |
| *G06Q 30/0273* | (2023.01) |
| *G06Q 50/00* | (2024.01) |
| *G06Q 50/06* | (2024.01) |
| *G07F 9/02* | (2006.01) |
| *G07F 15/00* | (2006.01) |
| *G07F 17/16* | (2006.01) |

(52) U.S. Cl.
CPC ............ *G07F 9/023* (2013.01); *G07F 15/005* (2013.01); *G07F 17/16* (2013.01); *G06Q 50/01* (2013.01)

(58) Field of Classification Search
CPC ..... Y02T 10/70; Y02T 10/7072; Y02T 90/12; Y02T 90/16; B60L 53/68
See application file for complete search history.

(56) References Cited

U.S. PATENT DOCUMENTS

| | | | | |
|---|---|---|---|---|
| 9,352,659 | B1 | 5/2016 | Turner | |
| 9,548,629 | B2 | 1/2017 | Siglock | |
| 10,592,092 | B2* | 3/2020 | Washeleski | G06F 3/03547 |
| 2011/0035864 | A1 | 2/2011 | Gordon et al. | |
| 2011/0191186 | A1* | 8/2011 | Levy | G06Q 30/00 705/14.58 |
| 2011/0204847 | A1* | 8/2011 | Turner | G06Q 30/0269 320/109 |
| 2011/0227531 | A1* | 9/2011 | Rajakaruna | B60L 53/305 320/109 |
| 2012/0116575 | A1 | 5/2012 | Prosser et al. | |
| 2012/0268245 | A1* | 10/2012 | Alexander | G07F 15/005 340/5.82 |
| 2013/0124320 | A1* | 5/2013 | Karner | G06Q 10/02 705/14.54 |
| 2013/0151293 | A1* | 6/2013 | Karner | B60L 58/30 705/5 |
| 2013/0304583 | A1 | 11/2013 | Han et al. | |
| 2013/0328525 | A1* | 12/2013 | Erger | H02J 7/00 320/109 |
| 2014/0067660 | A1* | 3/2014 | Cornish | G06Q 20/145 705/39 |
| 2014/0358649 | A1* | 12/2014 | Son | G06Q 30/0241 705/14.4 |
| 2015/0127462 | A1* | 5/2015 | Fujita | H02J 7/00036 705/14.64 |
| 2015/0224888 | A1* | 8/2015 | Wild | G06Q 20/145 705/26.9 |
| 2015/0363826 | A1 | 12/2015 | Tseng et al. | |
| 2016/0042401 | A1* | 2/2016 | Menendez | G06Q 30/0261 705/14.43 |
| 2016/0129802 | A1 | 5/2016 | Yoon et al. | |
| 2016/0297316 | A1 | 10/2016 | Penilla et al. | |
| 2017/0083989 | A1 | 3/2017 | Brockman et al. | |
| 2017/0169648 | A1 | 6/2017 | Penilla et al. | |
| 2017/0253131 | A1* | 9/2017 | Kilic | B60L 53/305 |
| 2018/0285996 | A1* | 10/2018 | Ma | G06F 16/2428 |
| 2019/0031038 | A1* | 1/2019 | Pursifull | B60L 53/65 |
| 2019/0102837 | A1* | 4/2019 | Smith | H04L 67/10 |
| 2019/0102850 | A1* | 4/2019 | Wheeler | G06Q 20/102 |
| 2019/0152327 | A1* | 5/2019 | Choi | G07F 15/008 |
| 2019/0279181 | A1* | 9/2019 | Kelly | G06Q 20/202 |
| 2020/0011995 | A1* | 1/2020 | Send | G01S 7/4818 |

FOREIGN PATENT DOCUMENTS

| | | |
|---|---|---|
| TW | I556542 B | 11/2016 |
| WO | 2011126600 A1 | 10/2011 |
| WO | 2017005678 A1 | 1/2017 |
| WO | 2017066002 A1 | 4/2017 |
| WO | 2017092817 A1 | 6/2017 |

OTHER PUBLICATIONS

International Search Report and Written Opinion for PCT/US18/58203, mailed Jan. 22, 2019.
CIPO, Office Action for corresponding Canadian Patent Application No. 3,081,319, dated May 31, 2021, 4 pages.
EPO, Extended European Search Report for corresponding European Patent Application No. 18874178.9, mailed Oct. 12, 2021, 11 pages.
Anonymous: "Blockchain—Wikipedia", Jun. 13, 2017 (Jun. 13, 2017), XP055408908, Retrieved from the Internet: URL: https://en.wikipedia.org/w/index.php?title=Blockchain&oldid=785374674 [retrieved on Sep. 21, 2017].
CIPO, Office Action for corresponding Canadian Patent Application No. 3,081,319, mailed Mar. 29, 2022, 8 pages.
EPO, Office Action for corresponding European Patent Application No. 18874178.9, dated Apr. 2, 2024, 9 pages.
CIPO, Office Action for corresponding Canadian Patent Application No. 3,081,319, mailed May 9, 2023, 9 pages.

* cited by examiner

METHOD AND SYSTEM FOR DELIVERY OF A TARGETED ADVERTISEMENT BY AN ELECTRIC VEHICLE CHARGING APPARATUS

CROSS-REFERENCE TO RELATED APPLICATIONS

This application claims the benefit of the filing date of U.S. Provisional Patent Application No. 62/578,759 filed Oct. 30, 2017, the disclosure of which is hereby incorporated herein by reference.

TECHNICAL FIELD

The present disclosure generally relates to electric battery charging systems, and more particularly, using an electric vehicle (EV) charging apparatus to deliver a targeted advertisement.

BACKGROUND

The infrastructure for EV charging is rapidly growing due to the growth in the adoption of EVs by users worldwide. Typically, EV charging may occur at the following locations: consumer homes, commercial parking lots and properties, businesses, and public charging stations. The experience of the EV user taking an electric power cable connected to an EV charging apparatus and plugging the power cable into an electric outlet of the EV is not dissimilar from those actions performed by a user of a gasoline powered vehicle at a conventional fuel pump. Consequently, from the time of connecting the power cable to until the time of disconnecting the power cable from the EV, the EV user usually spends several minutes at or near the EV charging apparatus.

Targeted advertising has the objective of delivering an advertisement to a user who is likely to find the advertising useful and suited to his interests and, thus, act, such as to purchase the advertised product or service, based on the advertisement. However, there are various difficulties associated with successfully delivering over a communication network an advertisement that is targeted to a particular user, such that there would be a high likelihood the user will actually receive and read the advertisement, such as on a display device.

Accordingly, there exists a need for method, apparatus and system for delivering an advertisement targeted to a user that improves the likelihood that the user will receive and read an advertisement, which is specifically suited to the interests or needs of the user, where the advertisement is provided over a communication network and displayed on a display device.

SUMMARY

In accordance with the present disclosure, a method for charging a battery of a mobile energy storage and power consumption device installed on an electric vehicle (EV) at a selected EV charging apparatus among a plurality of EV charging apparatuses may include: controlling, by a processing device of a server remote from the EV charging apparatuses, determining, from advertisement information, a target advertisement in accordance with identification information identifying the EV or at least one user of the EV, profile information for the EV or the at least one user, and advertisement characteristic information included in the advertisement information and corresponding to the target advertisement; when information indicating charging of the battery of the mobile energy storage and power consumption device of the EV is expected to be performed at the selected EV charging apparatus is determined, transmitting, over the communication network, target advertisement information indicating the target advertisement and with identification information including at least one of an identifier of the selected EV charging apparatus or an identifier of a wireless communication device of the at least one user, to cause display of the target advertisement at at least one display, in which the at least one display includes at least one of a display of the selected EV charging apparatus or a display of the wireless communication device; and receiving, over the communication network, from the selected EV charging apparatus, advertisement delivery information indicating when the mobile energy storage and power consumption device is at or connected by an electric power cable with the selected EV charging apparatus, identity of the EV or the at least one user, and information describing rendering of the target advertisement on a display of or associated with the selected EV charging apparatus.

In accordance with the present disclosure, an apparatus for charging a battery of a mobile energy storage and power consumption device installed on an electric vehicle (EV) may include: an electric power charging device; and processor and a memory including instructions which, when executed by the processor, control: supplying electric energy from the power charging device via an electric power cable; receiving, over a communication network, target advertisement information indicating a target advertisement associated with identification information identifying an electric vehicle (EV) or at least one user of the EV, in which the target advertisement is in accordance with the identification information, profile information for the EV or the at least one user, and advertisement characteristic information corresponding to the target advertisement, wherein the target advertisement information is transmitted from an external apparatus at least a predetermined time length before an expected start time of charging of the battery of the mobile energy storage and power consumption device of the EV at the apparatus; storing, in the memory, the target advertisement information associated with the identification information; when a mobile energy storage and power consumption device of the EV is determined to be located at the apparatus or connected with the power charging device, rendering the target advertisement on a display of or associated with the apparatus; and transmitting, over the communication network, advertisement delivery information indicating rendering of the target advertisement on the display and identity of the EV or at least one user of the EV.

DETAILED DESCRIPTION

The technology of the present disclosure relates to, by way of example, system, apparatus and method for controlling charging of a battery of one or more mobile energy storage and power consumption devices, such as installed on EVs, and delivering a targeted advertisement, provided over a communication network, at an EV charging apparatus selected for charging the battery of the mobile energy storage and power consumption device of an EV and/or a software application ("app") on a smart Phone, tablet or like device that may perform functions to manage at least partially a process for EV charging. For ease of reference, the charging of a battery included in a mobile energy storage and power consumption device of an EV is referred to below as "charging an EV."

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with EV charging and an EV charging system have not been shown or described in detail to avoid unnecessarily obscuring descriptions of the embodiments.

Embodiments of the present disclosure are described generally with respect to a power system controller, which may be employed in various settings for charging batteries of respective EVs. Although the present disclosure uses EV battery charging for an automobile as an example of charging an EV, it is to be understood that the aspects of the present disclosure may apply to other EV charging applications, such as for charging of EVs such as electric motorcycles, electric bicycles, electric trucks, electric buses, electric aircraft, and the like.

EXAMPLE SYSTEMS

Figure 1:
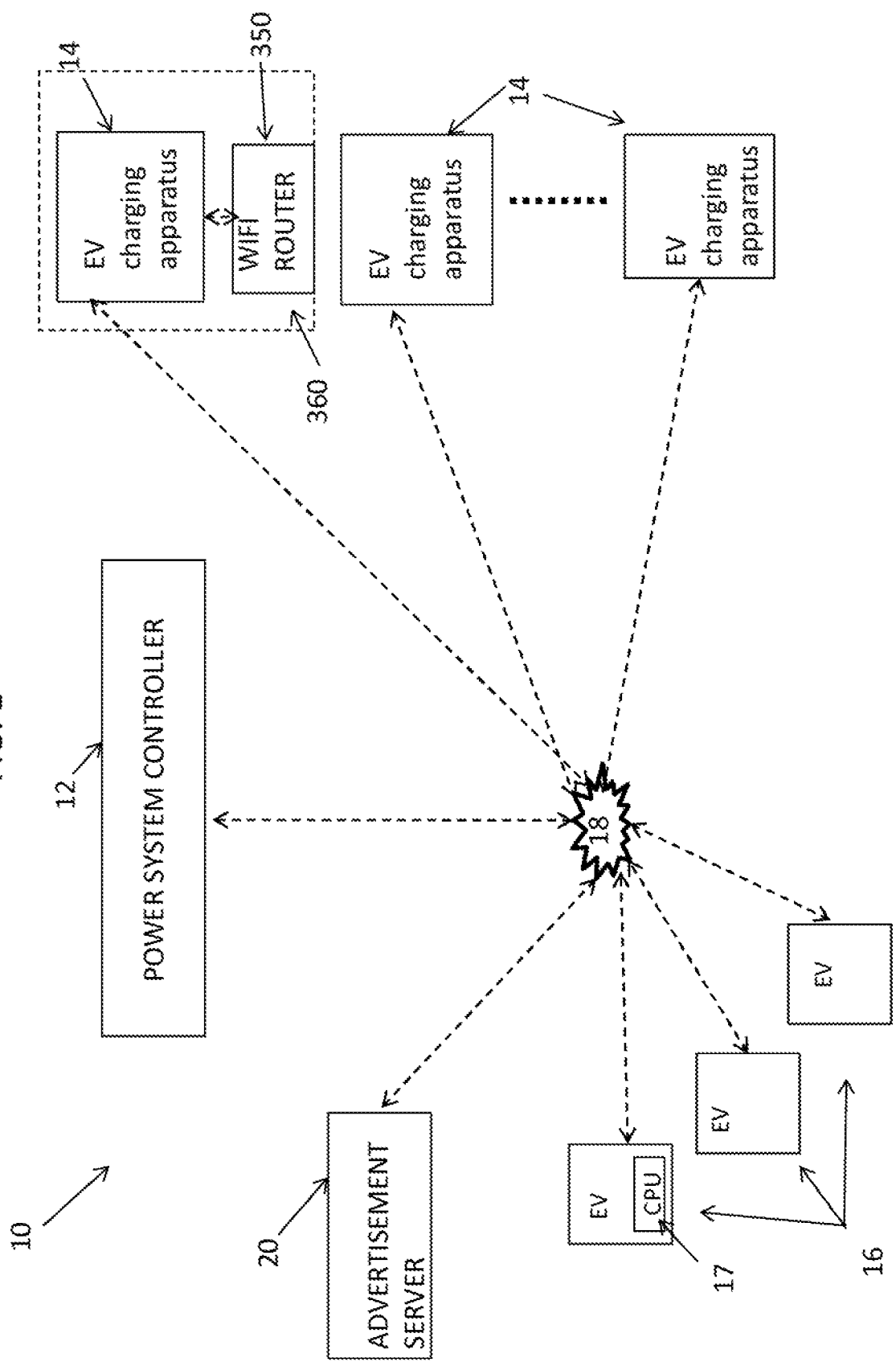
FIG. 1 is a block diagram of an exemplary electrical power control system, in accordance with aspects of the present disclosure.

FIG. 1 illustrates a block diagram of an exemplary electric power system 10. The system 10 may include a power system controller 12, EV charging apparatuses 14 and EVs 16 communicatively coupled with one another via a communication network 18. In addition, an advertisement server(s) 20 may be communicatively coupled with the controller 12 and/or the apparatuses 14 via the network 18.

Although not shown, the EV charging apparatus 14 may be coupled via electric power wiring to an energy storage device or a power distribution grid, from which electrical power may be received for charging an EV, such as an electric automobile.

The EV 16 may include a controller device 17, such as a computer processing unit (CPU), to implement charging related operations, such as requesting EV charging and monitoring status of battery charge, and also include location determination components (not shown), such as a GPS device, for generating location data indicating current location of the EV 16. In addition, the controller device 17 of the EV 16 may include a communication device (not shown) that allows for communication via the network 18.

The advertisement server 20 may be a computing device having communication capabilities and storing advertisement information including advertisement content and advertisement characteristic information indicating type, category or other descriptive information for each advertisement included in the advertisement content. In addition, the server 20 may be coupled to other servers (not shown) which provide advertisement content, and may process advertisement delivery information indicating, for example, a number of times, when and to whom advertisements were displayed at an EV charging apparatus, or alternatively at a display of a wireless communication device associated with the EV charging apparatus ("associated display device"), such as a smart phone or tablet of a user of an EV which is to be charged at the EV charging apparatus and where the associated display device includes an app for helping to manage EV charging related functions as described herein, to determine payment information indicating fees to be paid by advertisers based on display of their advertisements by EV charging apparatuses or associated display devices. The server 20 may transmit the payment information to other servers associated with the advertisers, and also to the power system controller 12.

Figure 2:
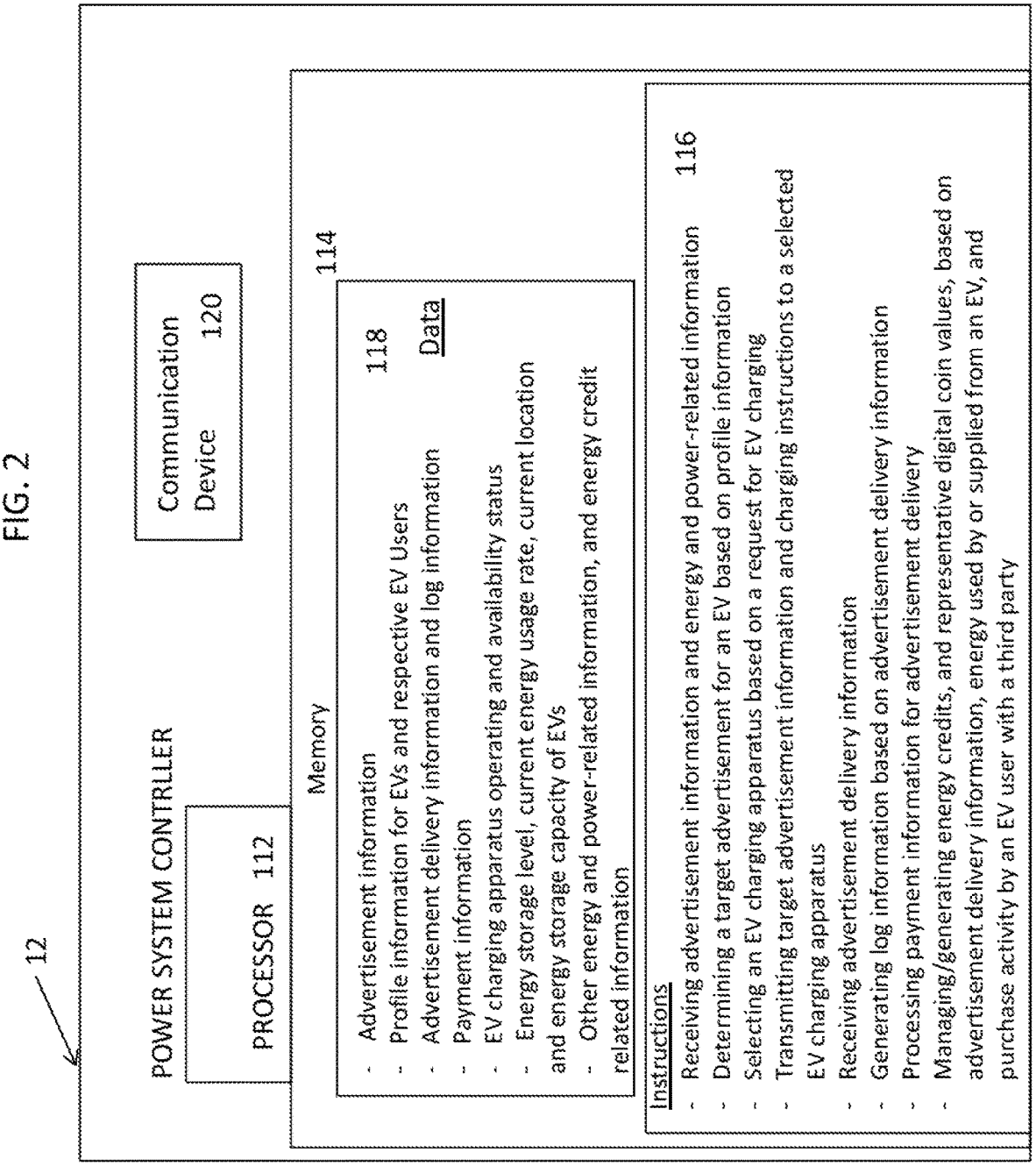
FIG. 2 is an illustration of a block diagram of an exemplary power system controller of FIG. 1, in accordance with aspects of the present disclosure.

FIG. 2 illustrates an exemplary embodiment of the power system controller 12 of the system 10. The controller 12 may be in the form of a computing device that includes one or more processors 112, one or more memory 114, and other components commonly found in computing devices.

The memory 114 may store information accessible by the one or more processors 112, including instructions 116 that may be executed by the one or more processors 112. Memory 114 may also include data 118 that can be stored, manipulated, or retrieved by the processor. Such data 118 may also be used for executing the instructions 116 and/or for performing other functions. Such memory may be any type of non-transitory media readable by the one or more processors, such as a hard-drive, solid state hard-drive, memory card, ROM, RAM, DVD, CD-ROM, write-capable, read-only memories, etc.

The instructions 116 may be any set of instructions capable of being read and executed by the one or more processors 112. The instructions may be stored in a location separate from the computing device, such as in a network attached storage drive, or locally at the computing device. The terms "instructions," "functions," "application," "steps," and "programs" may be used interchangeably herein.

Data 118 may be stored, retrieved and/or modified by the one or more processors 112 in accordance with the instructions 116. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the controller 12 may include a communication device 120 configured to provide wired or wireless communication capabilities. The one or more processors 112 may be any type of processor, or more than one type of processor. For example, the one or more processors 112 may be CPUs from Intel, AMD, and Apple, or application specific integrated circuits (ASIC) or system on chips (SoCs).

FIG. 2 illustrates the components of the controller 12 as being single components, however, the components may actually comprise multiple processors, computers, computing devices, or memories that may or may not be stored within the same physical housing. For example, the memory may be a hard drive or other storage media located in housings different from that of the controller 12. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the power system controller 12 as described below may at least be partially performed at one of the EV charging apparatuses 14 or the server 20. In another embodiment, functions described in this disclosure as performed at one of the EV charging apparatuses 14 or the server 20 may at least be partially performed at the controller 12, the CPU of an EV, or a smart phone or tablet of an EV user, such as by execution of an app stored therein. In one embodiment, functions described herein as performed by the server 20 and the controller 12, and also the apparatuses 14, may be distributed among one or more computing devices (servers) that operate as a cloud system that controls (i) tracking and storing information describing advertisement content delivery and energy related actions at the apparatuses 14, such as charging of an EV or supplying energy from an EV to the charging apparatus for storage or distribution over a power grid or microgrid; and (ii) generating energy credits based on the advertisement delivery and EV charging, managing the energy credits based on actions of EV charging or purchase of other goods or services, managing a digital currency asset, such as a cryptocurrency or the like, representative of the energy credits, and trading the energy credits or the digital currency asset in a financial marketplace.

Referring to FIG. 2, the controller 12 may be configured to provide specific functions in accordance with embodiments of the present disclosure, and in some embodiments may be programmed with programs to perform some or all of the operations described herein. It is be understood that the information describing EVs, user(s) of EVs, a smart phone and tablet of an EV user and EV charging apparatuses referred to below is for EVs, EV users, smart phone and tablets of EV users and EV charging apparatuses that are registered with the controller 12, such that identification information for the EVs, the EV user smart phone and tablets and EV users is stored in data 118 of the memory. In some embodiments the controller 112 may be programmed to store, in the memory 114: advertisement information including advertising content and advertisement characteristic information describing each advertisement included in the advertising content, such as, for example, age relevance, product or service, date relevance, pricing, subject matter, availability and the like; profile information indicating a unique identifier for each EV and user(s) of the EV, characteristic information of the EV including type, model, year, etc., and characteristic information of the user(s) indicating, for example, age, sex, gender, interests, prior purchases, social media contacts and the like; advertisement delivery information indicating an identifier of an advertisement displayed at an EV charging apparatus or associated display device, date and time when display of the advertisement started, length of time the advertisement was displayed, identity of an EV and EV user, whether and length of the time the user(s) viewed the advertisement while the advertisement was being displayed, and the like; log information generated from the advertisement delivery information that is a compilation of information concerning display of respective advertisements by the apparatuses 14 for respective EV users who are targets of the advertisements; and payment information indicating a fee to be paid by an advertiser based on the circumstances of display of an advertisement thereof at EV charging apparatuses or associated display devices as indicated by the advertisement delivery information or the log information. In addition, the controller 112 may be programmed to store, in the memory 114, information on operating status and availability of EV charging apparatuses 14, and other information on availability and pricing of electric power for supply from the power grid or any electric power resource. Further, the controller 112 may be programmed to store, in the memory 114, information indicating energy storage level, current energy usage rate, current location and energy storage capacity of EVs; and any other energy and power-related information (EP information), such as associated with controlling charging of EVs from EV charging apparatuses of the electric power system 10 by the controller 12.

In one embodiment, the controller 112 may be programmed to store, in the memory 114, as the EP information, EV user action information, transmitted by apparatuses 14, which indicate actions of an EV user at the apparatus 14. The actions included in the EV user action information may be identified by an identifier of the EV corresponding to the user or other unique identifiers, such as a credit card of the EV user, an RFID associated with the EV user, and the like, or an identifier of an EV user's smart phone or tablet. The actions in the EV user action information may include information describing charging of the EV at the apparatus 14, supplying electrical energy from the battery of the EV to the apparatus 14 for storage at a suitable energy storage resource or distribution over a power grid or microgrid, detecting a first EV leaving a location, such as a spot in a first parking lot designated for charging by a first apparatus 14, and detecting the first EV relocating to a different parking lot at which a second apparatus 14 is located, where the detection of presence of the EV at the respective parking lots is respectively by the first and second EV apparatuses.

In a further embodiment, the controller 112 may be programmed to store, in the memory 114, information related to energy credits generated or used; information related to digital currency representative of the energy credits; information related to trading of the energy credits or the digital currency in a financial marketplace; and information related to EV user purchase transactions with a third party executed via a software application at an EV charging apparatus, or by linking to a website of the third party using a link indicated on the display of the EV charging apparatus and/or an associated display device, where the purchase transactions may be performed using the energy credits or the digital currency representative of the energy credits.

Also, the controller 12 may be programmed to store, in the memory 114, instructions 116 for controlling: receiving and storing advertisement information; determining a target advertisement for an EV based on the profile information and the advertisement information; receiving EP information including EV location, EV storage capacity information, EV charging apparatus availability information, and a request for charging an EV; determining power charging schedules for charging EVs respectively at selected EV charging apparatuses; transmitting charging instructions for charging EVs according to respective power charging schedules; transmitting target advertisement information to the EV charging apparatuses; receiving advertisement delivery information from the EV charging apparatus; generating, storing and transmitting log information, where the log information is based on the advertisement delivery information and describes details of the delivery of advertisements at the respective EV charging apparatuses to EVs and EV users which are targets of the advertisements; determining payment information indicating fees to be paid by advertisers for delivery of advertisements thereof at the EV charging apparatuses in accordance with the log information or the advertisement delivery information. In addition, the instructions 116 may provide for controlling: tracking and managing energy or general purpose credits generated based on advertisement delivery and supply of electrical energy from an EV to a charging apparatus; using the energy credits to purchase EV charging for an EV; exchange of the energy credits for any goods and services; trading and valuation of the energy credits in a financial market; generating a digital asset, such as a cryptocurrency using block chain technology, to track user actions identified by EV users in respective blocks of a chain; maintaining a current digital coin value for the chain in a last created block of the chain, according to values respectively of the EV user actions encoded into the other blocks of the chain; and trading and valuation of the digital assets in a financial marketplace.

In one embodiment, the instructions 116 may provide for controlling managing and generating energy credits or digital coin values representative of energy credits, based on advertisement delivery information, information describing an amount of energy supplied from an EV charging apparatus to charge an EV, information describing an amount of energy supplied from an EV to an EV charging apparatus, and information describing a purchase activity by an EV user performed using an application or a website of a third party, such as an owner or operator of an e-commerce website.

Figure 3:
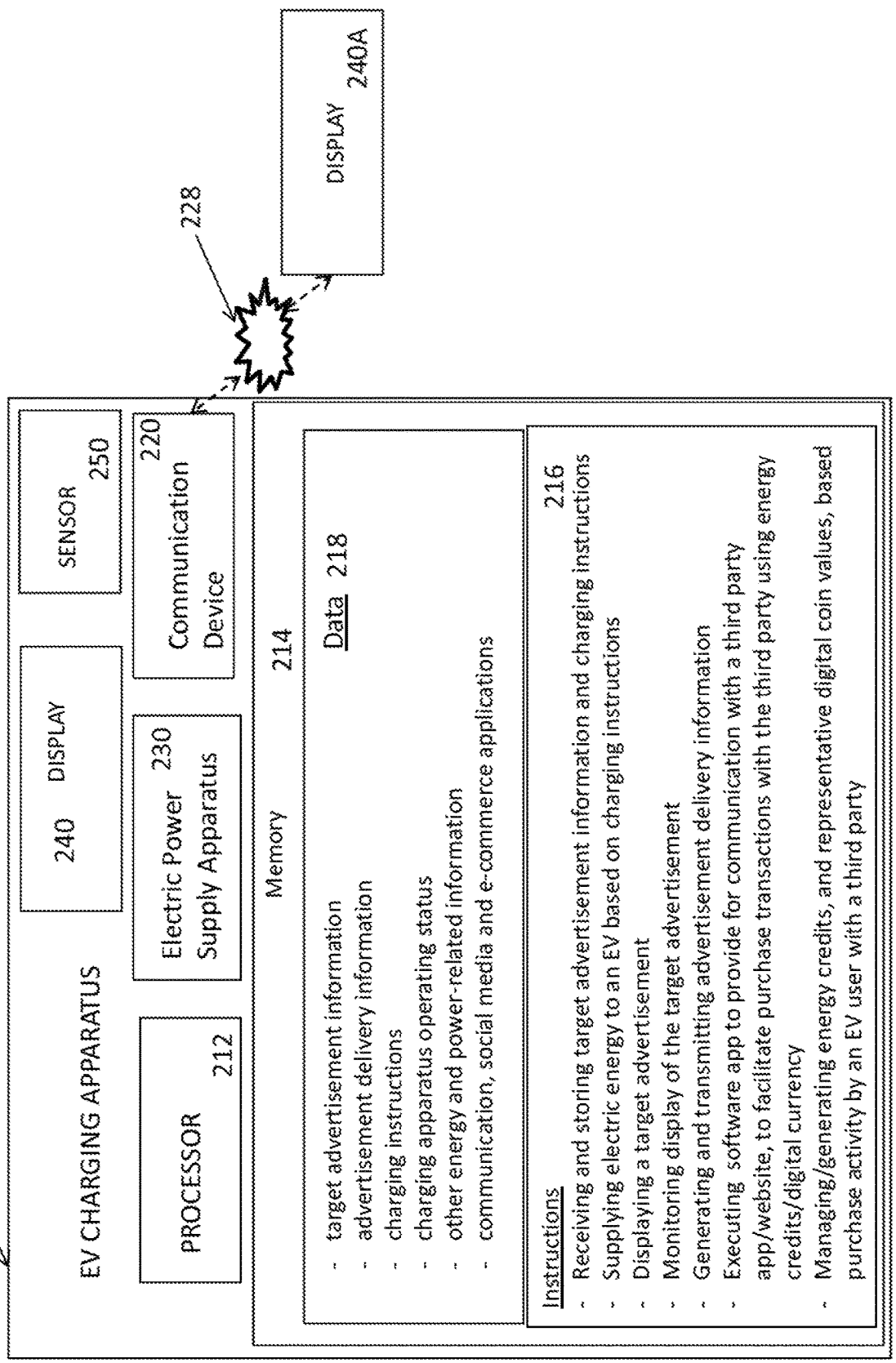
FIG. 3 is an illustration of a block diagram of an exemplary EV charging apparatus of FIG. 1, in accordance with aspects of the present disclosure.

FIG. 3 illustrates an exemplary embodiment of an EV charging apparatus 14. The apparatus 14 may include a component that is in the form of a computing device which includes one or more processors 212, one or more memory 214, and other components commonly found in computing devices. For ease of reference, the computing device of an EV charging apparatus is referred to herein as "EV charging controller." The apparatus 14 may be a personal computing device, such as intended for use by a user, and have all of the components normally used in connection with a personal computing device such as a central processing unit (CPU), memory (e.g., RAM and internal hard drives) storing data and instructions.

The memory 214 may store information accessible by the one or more processors 212, including instructions 216 that may be executed by the one or more processors 212. Memory may also include data 218 that can be stored, manipulated, or retrieved by the processor. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the apparatus 14 may include a communication device 220 configured to provide wired or wireless communication capabilities. The one or more processors 212 may be any type of processor, or more than one type of processor. For example, the one or more processors 212 may be CPUs from Intel, AMD, and Apple, or application specific integrated circuits (ASIC) or system on chips (SoCs).

The EV charging apparatus 14 may be configured to provide specific functions in accordance with embodiments of the present disclosure, and in some embodiments may be programmed with programs to perform some or all of the operations described herein. In some embodiments the processor 212 may be programmed to store, in the memory 214, target advertisement information, advertisement delivery information, charging instructions for charging an EV according to a charging schedule, a charging schedule for the EV, EV charging apparatus operating status information, other EP information, data for executing communication and third party software applications, such as e-commerce and social media applications, and information associated with the communication and third party applications.

Also, the apparatus 14 may be programmed to store, in the memory 214, instructions 216 for controlling: receiving and storing target advertisement information; receiving charging instructions indicating a charging schedule for charging an EV; supplying electric energy to charge an EV according to the charging schedule; displaying a target advertisement included in the target advertisement information using the EV charging apparatus, based on detection of EV location or charging of the EV; monitoring display of the target advertisement, which includes controlling a sensor for sensing presence of a user viewing the display; generating advertisement delivery information based on monitoring information which is generated from monitoring display of the target advertisement and indicates activities of a EV user(s) when the target advertisement is being displayed; transmitting the advertisement delivery information to the controller 12 or another external device, such as the server 20; and user interactions via a communication network with a third party, such as performed at a software application of the third party executed at the EV charging apparatus or a website of the third party, to facilitate purchase transactions performed using the website or the application of the third party, using energy credits or digital currency representative of the energy credits.

Further, the apparatus 14 may include an electric power supply apparatus 230, a display 240 and a sensor device 250, each controllable by the processor 212. The electric power supply apparatus 230 may include electrical power components for supplying electrical energy, from an electric power source, to the EV via an electric power cable of apparatus 230 which is for connecting with an electrical power interface at the EV. The sources of electric power may include alternative energy or renewable power resources, or a storage system that stores energy which may be used to output electrical power.

The display 240 may be a monitor having a screen, a touch-screen, a projector, a television, or other device that is operable to display information. The display 240 may be a part of an external surface of a housing that contains the components of the apparatus 14. In one embodiment, the display may be a surface of an EV charging apparatus.

In addition, the apparatus 14 may include (not shown) a user input device (e.g., a mouse, keyboard, or microphone).

The sensor device 250 may include a camera or proximity sensor, and generate sensor information indicating presence of a detected object, such as a user, in the vicinity of the display, such as in images obtained by the camera. In addition, the sensor information may include information identifying a user or EV, which is determined from performing recognition processing on images.

In one embodiment, the EV charging apparatus 14 may be communicatively coupled, via a communication network or a communication cable 228, with another display 240A external to the apparatus 14, to which display data including the target advertisement may be provided for display thereon from the apparatus 14, under control of the processor 212. The display 240A may be an associated display device, such as a smart phone, tablet or like device, where the associated display device may be operable to execute an app that performs functions to help manage a process for EV charging, where the process further includes advertisement delivery and other functions as described in the present disclosure.

In another embodiment, referring to FIG. 1, the EV charging apparatus 14 may be communicatively coupled with another communication device 350 which is located within a same region 360, such as building or a home, in which the apparatus 14 is located. The communication device 350 may be, for example, a Wi-Fi router having a higher communication data rate (bandwidth) capability than a bandwidth capability of the communication device 220 which the apparatus 14 uses to receive information, such as charging instructions and target advertisement information, over the network 18 from the controller 12.

In another embodiment, the processor and memory of each apparatus 14 may, in combination, comprise a full-sized personal computing device, or alternatively comprise a mobile computing device capable of wirelessly exchanging data with a server, such as the controller 12, over a network, such as the Internet.

The communication network 18 may be a wired, wireless or powerline communication network, or combination of such networks, that communicatively couples the components 12, 14, 16 and 20 to the Internet or another communication network, such as a cloud communication network. In one embodiment, the communication network 18 may include interconnected protocols and systems. For example, the network may be implemented via the Internet, intranets, local area networks (LAN), wide area networks (WAN), etc. Communication protocols such as Ethernet, Wi-Fi, and HTTP, Bluetooth, LTE, 3G, 4G, Edge, etc., power line communication networks, such as HOMEPLUG and the like, and various combinations of the foregoing may be used to allow nodes to communicate.

In accordance with aspects of the present disclosure, any of the processing devices of the EV charging apparatuses may be configured to perform all or a portion of the methods described as the functions of the controller 12.

In accordance with an aspect of the present disclosure, the controller 12 may perform processing to determine charging schedules for charging EVs 16 using power from respective selected EV charging apparatuses 14, based on requests for charging from the EVs. The processing may determine power charging schedules for the EVs, based on EP information received over the communication network 18 from the EV charging apparatuses 14, the EVs 16 and also the power sources (not shown), such as controllers of a power grid to which the EV charging apparatuses are connected. As described in detail below, the controller 12 may determine target advertisements for delivery at the selected EV charging apparatuses, and use log information determined based on advertisement delivery information received from the selected EV charging apparatuses to generate or obtain payment information indicating fees to be paid by advertisers based on delivery of their respective advertisements at the selected EV charging apparatuses.

EXAMPLE METHODS

For purposes of illustrating the features of the present disclosure, an exemplary process for delivering a target advertisement, provided over a communication network, using an EV charging apparatus, such as on a display of the EV charging apparatus, when charging an EV at the EV charging apparatus is performed according to a charging schedule determined for the EV, is described below in connection with operations performed at components of the power system controller 12, a selected EV charging apparatus 14 and the server 20 of the system 10 as shown in FIG. 1.

Figure 4A:
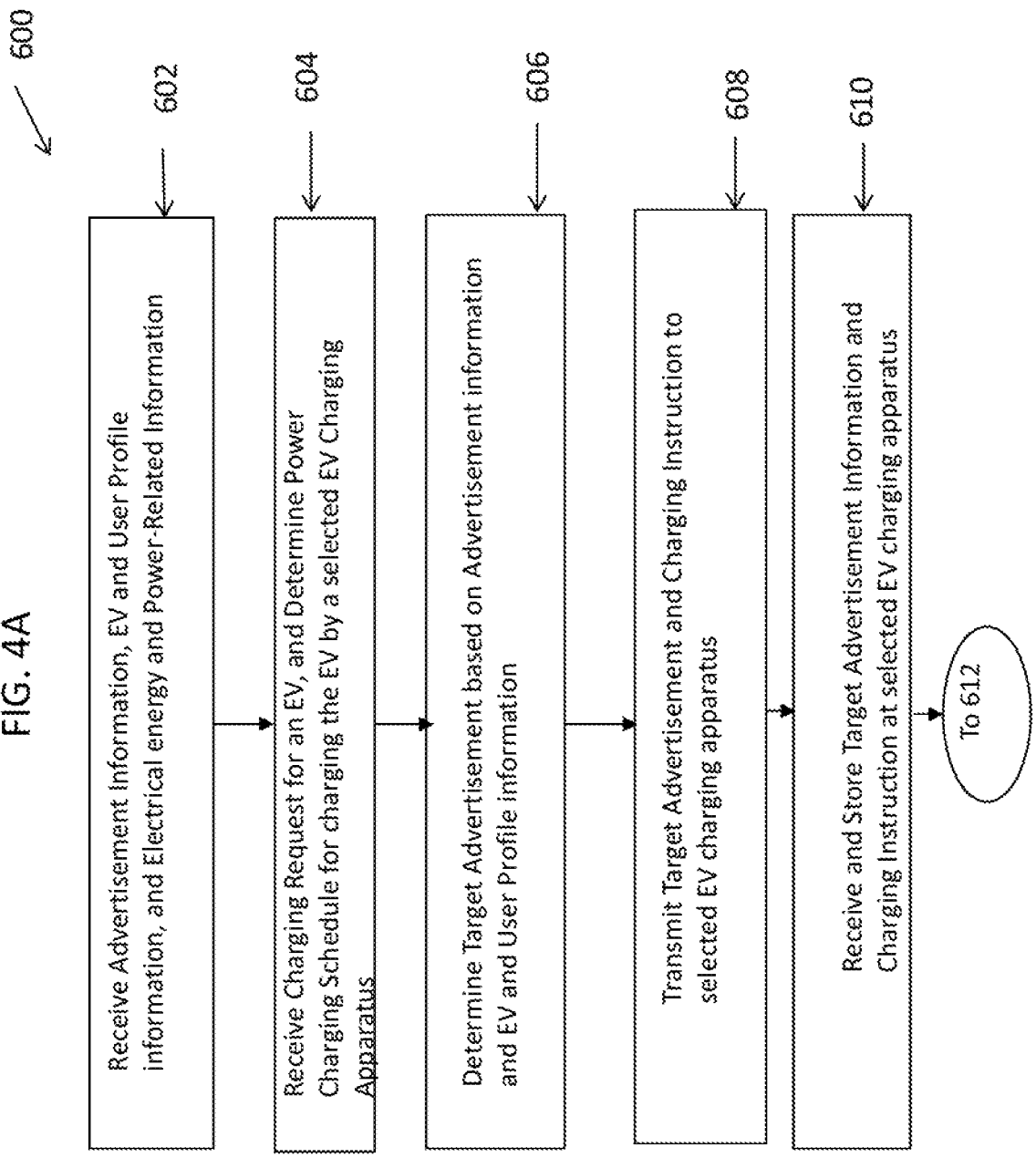
FIGS. 4A and 4B illustrate an exemplary high level flow diagram of a method for delivering a target advertisement using an EV charging apparatus, in accordance with aspects of the present disclosure.
Figure 4B:
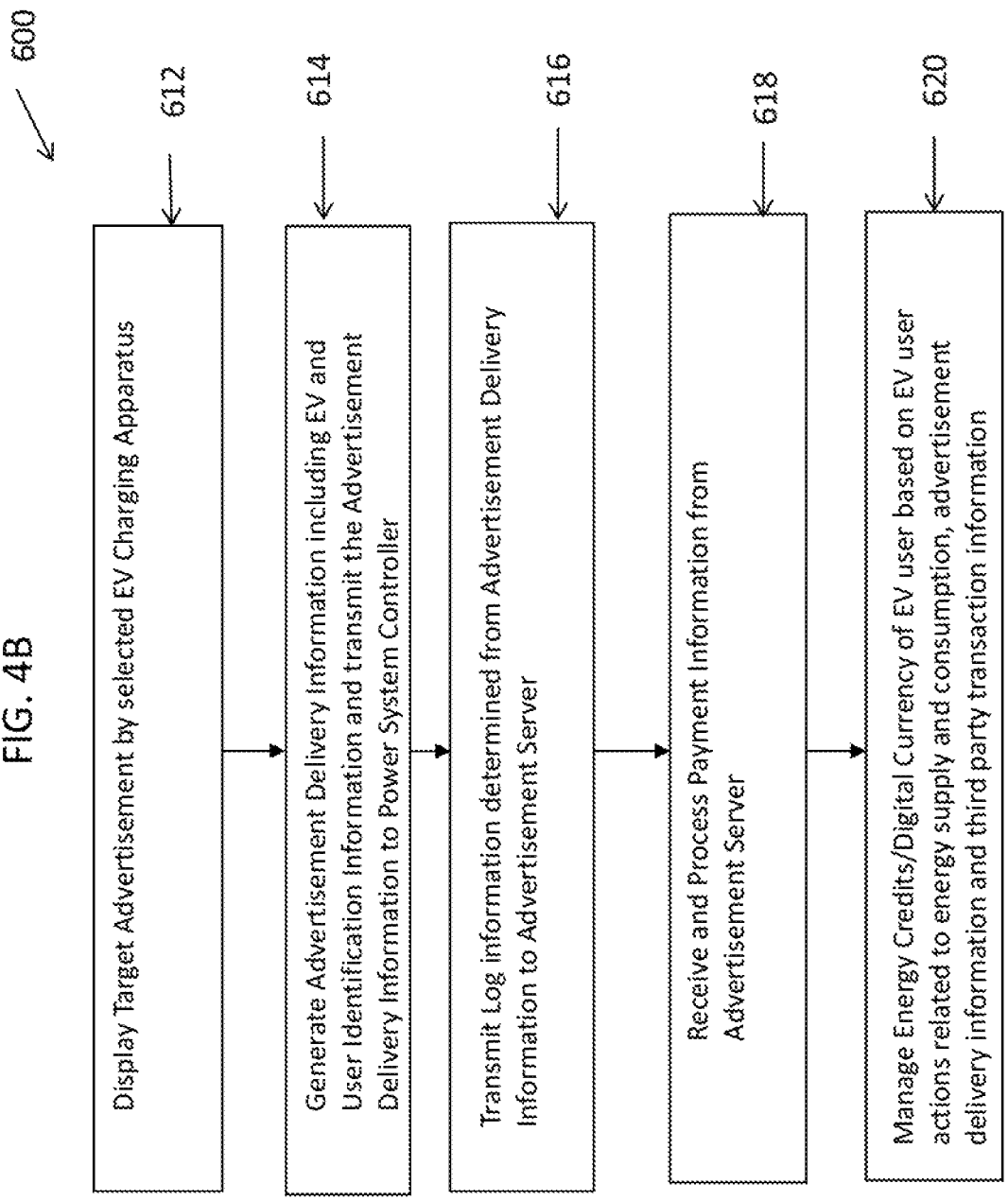

Referring to FIGS. 4A and 4B, a high-level block diagram 400 of a method for charging a battery of an EV 16 using a selected one of the EV charging apparatuses 14 of the system 10, displaying a target advertisement on a display of the selected apparatus 14, and obtaining advertisement delivery information for determining a fee to be paid by an advertiser based on display of the target advertisement which is of the advertiser, is illustrated. Although the method of flow diagram 400 as described below identifies specific functions performed by the controller 12, apparatuses 14 and the server 20, it is to be understood that, in accordance with aspects of the present disclosure, the functions of the controller 12, or any other function performed at the apparatuses 14 or the server 20, may be distributed among several servers/computing devices, which together form a cloud control system that may perform any or all functions of the disclosure. For example, the controller 12 may respectively control power management and charging schedules, which include controlling operations of a utility power grid or microgrid, to provide power for charging by EV apparatuses according to charging schedules; and the server 20, as a separate server or alternatively another server, may control some or all functions related to advertisement content delivery, managing payment information based on the advertisement delivery, and managing accounts of EV users based on financial values corresponding or attributed to advertisement content delivery, energy used to charge EVs and energy supplied from the EVs to the charging apparatus.

In block 602, the controller 12 may receive, via the communication network 16, advertisement information from the advertisement server 20 and store the received information in a memory thereof. In addition, the controller 12 may receive profile information for EVs 16 and respective user(s) of the EVs 16, over the communication network 18, when, for example, the EVs and users register with the controller 12 for EV charging services, which include determining schedules to charge EVs using the EV charging apparatuses 14.

In addition, the controller 12 may receive, via the communication network 18, from EV charging controllers of respective charging apparatuses 14, charging availability information indicating current and expected charging operating status respectively for the charging apparatuses 14. Also, the controller 12 may receive, over the communication network, information indicating whether energy is available at electrical energy power sources of the apparatuses 14, and other EP information that may be useful to determine a power charging schedule for an EV 16 in response to a request for charging. In one embodiment, the EP information may include information related to consumption of power at the EVs over time.

In block 604, the controller 12 may receive, over the network 18, a request for charging from an EV 16. Based on the request, in block 604, the controller 12, using the EP information received in block 602, may determine a power charging schedule for the EV 16 at a selected one of the EV charging apparatuses 14. The power charging schedule may be determined based on information indicating current energy storage level, current energy usage rate, and current location and energy storage capacity of EVs that require charge within a predetermined time period, and also using information indicating predetermined timing for providing a predetermined minimum charge level for the EVs. In addition, the power charging schedule may be determined in accordance with charging availability information for charging apparatuses 14 and information indicating price for supplying electric power from the power grid or an alternative power resource. In some embodiments, the power charging schedule for charging an EV at a selected EV charging apparatus may be determined by evaluating factors and information such as described in U.S. Prov. Appn. Nos. 62/462,095 filed Feb. 22, 2017 and 62/501,285 filed May 4, 2017, incorporated by reference herein.

In block 606, when the charging apparatus 14 is selected based on the request for charging, the controller 12 may determine a target advertisement for the EV and a user(s) of the EV. The target advertisement may be selected from a plurality of advertisements by, for example, determining whether and the extent to which features of advertisement characteristic information of the respective advertisements match or correspond to features of characteristic information of the EV or the user(s) of the EV indicated in the profile information. In an alternative embodiment, the target advertisement for the EV and users of the EV may be predetermined at the controller 12, before the request for charging the EV is received.

In block 608, the controller 240 may control transmission, over the network 18, of a charging instruction indicating a charging schedule for charging the EV 16 to the EV 16 and the selected charging apparatus 14, and also transmission, over the network 18, of target advertisement information including the target advertisement for reception by the selected charging apparatus 14. The target advertisement information includes the target advertisement, information identifying the EV and a user(s) of the EV corresponding to the target advertisement and information for controlling display of the target advertisement by the EV charging apparatus based on a determination by the EV charging controller that a charging process to charge the EV has commenced or is about to commence at the EV charging apparatus.

In one embodiment, the charging instruction and the target advertisement may be transmitted, over the network 18, with an identifier of a smart phone or tablet of the EV user, such that the charging instructions and the target advertisement may be received and accessed by a smart phone or tablet of the EV user. It is to be understood that, although not described below for the exemplary embodiment, in some embodiments the app of the smart phone or tablet of the EV user may perform the same or similar functions as performed by the EV charging controller of the apparatus 14 as described below for blocks 610, 612, 614, 616, 618 and 620.

In one embodiment, the communication device 220 of the charging apparatus 14 may have a capability of receiving data over the network 18 at variable speeds dependent on a selected communication channel, which may be of a LAN or WAN. In this embodiment, the target advertisement information may be transmitted from the controller 12 as soon as the EV charging apparatus is selected based on a request from an EV, to provide that the entirety of the target advertisement included in the target advertisement information is received timely at the EV charging apparatus. The timely received target advertisement is available for display at the EV charging apparatus at an expected time for starting charging the EV, as indicated by the charging schedule. In one embodiment, the target advertisement may be predetermined for the EV or EV user before the request for charging from the EV user is received, so as to provide that the target advertisement information including the target advertisement, which is transmitted at less than a maximum data transmission rate of a cellular network available for providing data communication services at the location of the EV charging apparatus, is received timely at the EV charging apparatus.

In one embodiment, the target advertisement may be transmitted based on expected time of arrival of the EV at the EV charging apparatus which is located at a home of the EV user. The expected time of arrival may be determined from a predictive pattern of travel of the EV user in relation to the home, where the predictive pattern is determined from analysis of data of times that the EV user arrives at the home and times that the EV user departs from the home. In one embodiment, the data of EV user arrival and departures times may be received, over the network 18, at the controller 12, at block 602, from the EV charging controller or the tablet or smart phone of the EV user. In one embodiment, the controller 12 may determine the predictive pattern from the arrival and departure time data.

In block 610, the EV charging controller at the selected apparatus 14 may receive and store the target advertisement information in memory, associated with a charging schedule indicated by the received charging instruction.

In block 612, the EV charging controller may determine when a specific EV, for which a target advertisement and a charging schedule has been received, is present at or near the apparatus 14. The EV may be determined to be present based on detection at the apparatus 14 of an electrical power cable connection between electrical power charging components of the electric power supply apparatus 230 and the EV. In one embodiment, protocols including the ISO/IEC 15118 may be used to identify the specific EV. In another embodiment, presence of the EV may be determined based on sensor information, such as generated by a proximity sensor sensing approach of the EV, or from recognition processing, such as of images acquired by a camera of the sensor device 250 of the charging apparatus. In one embodiment, the sensor device 250 or processor 212 may perform facial recognition processing to determine presence of a registered user of the EV or object recognition processing to identify the EV from an image of the EV itself. In another embodiment, the sensor device may be configured to transmit and receive optical or radio frequency signals for determining the presence of the EV from a license plate or other identifier on the EV vehicle, such as a magnetic or bar code tag on the EV. When presence of the EV is determined, the EV charging controller in block 612 may control display of the target advertisement on the display 240, or alternatively on another display 240A communicatively coupled with the EV charging apparatus.

In block 614, the EV charging controller may monitor the length of time the target advertisement is displayed on the display and whether a user is in the vicinity of the display during display of the target advertisement. The monitoring of whether the user is in the vicinity may be performed using recognition processing similar to that described above for block 612. The EV charging controller may store in its memory, as advertisement delivery information, information describing the monitored actions or events, such as length of time the user viewed the display with the target advertisement being displayed thereon, identity of the user viewing the display, length of time of the display of the advertisement, etc. Further, in block 614 the EV charging controller may control transmission, to the controller 12 over the network 18, of the advertisement delivery information, which includes identification information of the EV and the user of the EV detected as present or expected to be detected as present when a target advertisement was displayed.

In block 616, the controller 12 may generate log information from the advertisement delivery information received from the EV charging apparatuses 14. The log information may indicate the identity of the target advertisements displayed at the EV charger apparatuses 14, date and time the target advertisements were displayed, which EV charging apparatus displayed the target advertisements, length of time a target advertisement was displayed, the identity of the EV and EV user detected as present at a specific EV charging apparatus displaying the target advertisement, and the length of time the EV user viewed the display of the target advertisement. In addition, in block 616 the controller 12 may determine fees due from an advertiser based on the display of a target advertisement of the advertiser, according to a payment fee schedule including fee criteria such as a length of time the advertisement is displayed, length of time the advertisement was viewed by a user when displayed, characteristics of the user who viewed the advertisement, and the like. Further, the controller 12 may transmit, over the communication network 18, to the advertisement server 20 the log information along with information indicating what fees are due from the corresponding advertiser.

In block 618, the controller 12 may receive payment information from the advertisement server 20 indicating fees due from advertisers based on the display of their advertisements, where the fees due are determined based on the log information. In one embodiment, the controller 12 may credit an account associated with an owner or operator of the controller 12 or the charger apparatus 14, in accordance with the fees determined to be due from advertisers. In another embodiment, the controller 12 may determine at least some of the payment information and transmit the payment information to the advertisement server 20.

Advantageously, fees obtained from advertisers based on display of targeted advertisements thereof at the EV charging apparatus may be used, such as by manufacturers, owners or operators of devices, such as a power system controller similar to the controller 12 and EV charging apparatuses similar to the apparatus 14, to subsidize part or the entire cost of installing and operating an EV charging apparatus installed at a home, business, or public charging station, and managing at a power system controller charging requests from EVs to provide for charging the EVs by EV charging apparatuses according to power charging schedules.

In one embodiment, based on the payment information, the controller 12 may determine a portion of the fees from the advertisers to be allocated to an operator or owner of the EV charging apparatus 14 to subsidize the cost of obtaining communication network services at the apparatus 14, such as from a cellular service provider.

In one embodiment, based on the payment information, the controller 12 may determine an amount of the fees from advertisers to be credited towards cost of electrical energy supplied by the selected EV charging apparatus(es) for charging a specific EV. The amount of fees may be apportioned to an account of a user(s) of an EV, according to the fees received from advertisers whose advertisements are displayed at the selected EV charging apparatus used for charging the EV. In one embodiment, the amount of the fees credited to the accounts of the users may be based on a determination of the length of time an advertisement of an advertiser displayed at the selected EV charging apparatus was viewed by users.

In another embodiment, the EV charging controller may control display of a selectable input, such as a button, on the display, with indicia to notify an EV user of an option to request supplemental advertisement(s) for display at the EV charging apparatus, which are in addition to a target advertisement(s). Upon selection of the input, a request for supplemental advertisement may be communicated by apparatus 14 to the controller 12 over the communication network 18. The controller 12, in response to the advertisement request, may retrieve supplemental advertisements, from its memory or by requesting supplemental advertisement information from advertisement servers over the communication network 18, and then transmit the supplemental advertisements to the EV charging apparatus for display. The controller 12 and/or the EV charging controller may generate log information based on advertisement delivery at the display of the EV charging apparatus according to the supplemental advertisement request, and determine use of fees from the advertiser(s) of the supplemental advertisement for offsetting or subsidizing operating costs of the EV charging apparatus or costs to the EV user for charging at the EV charging apparatus.

In another embodiment, the EV charging controller may control display of a selectable input, such as a button, on the display, with indicia to notify an EV user of an option to request transmission of advertisement content displayed at the EV charging apparatus, such as a target advertisement or supplemental advertisement, to a computing device, such as a smartphone or the like, of the EV user. Upon selection of the input, a request for content delivery to the smartphone of the user may be communicated from the apparatus 14 over the network 18 to the controller 12. The controller 12 may have an email address or mobile telephone number of the EV user stored in the profile information for the EV user. In response to the request for content delivery to the EV user's computing device, the controller 12 may transmit, over the communication network 18, advertisement content as selectively identified by the EV user in the request for content delivery, to the email address or via text, such that the advertisement content is received at the EV user's smartphone and displayed on a display thereof.

In another embodiment, the display of the EV charging apparatus may include indicia of an option for selection of delivery of advertisement content to the computing device of the EV user according to a value designated for advertisement content. The value designated may correspond to a fee charged to an advertiser for display of its advertisement, where larger values correspond respectively to larger fees charged to an advertiser for an advertisement that is displayed. Based on the selection of a higher value advertisement by the EV user and the payment information indicating the fee due from the advertiser for the display of the advertisement, the controller 12 may credit an account of the EV user, in which fees for charging with an EV charging apparatus which is managed by the controller 12 are accumulated, with an amount corresponding to the fee for delivery of selected advertisement content to be paid by an advertiser to whom the selected advertisement content belongs.

In another embodiment, in block 620, and also referring to blocks 604, 608 and 614 of FIG. 4, a cloud system that may perform functions of the controller 12, EV charging controllers of the apparatuses 14 and the server 20 may use blockchain or like cryptographic techniques to record a history that securely and verifiably tracks events or actions ("EV user actions") related to EV charging and delivery of advertisements to a particular EV user using selected EV charging apparatuses of the system 10. For example, information of a charging request from an EV user transmitted to the controller 12 may be coded into a first block of an encoding chain; information of charging instructions and a target advertisement transmitted to the selected EV charging apparatus may be coded into a second block of the chain using information of the first block; and advertisement delivery information may be coded into a third block of the chain using information of the first and second blocks. The information coded into the blocks of the chain may include identities of EV users who use the system 10 to charge their EVs, and indicate a history of energy usage by the EV users at respective EV charging apparatuses and advertisement content delivery to the EV users by or through use of respective EV charging apparatuses. Each EV user action that is tracked is represented in a block of the chain.

In one embodiment, the chain may constitute a cryptocurrency or like digital asset ("digital coin"). In such embodiment, a value corresponding to the EV user action may be summed with an existing digital coin value for the digital coin, which is indicated in a last block of the chain before a next new block is created to track a new EV user action, to obtain a new, latest digital coin value for the digital coin, and the latest digital coin value is encoded in the new block of the chain. The EV user actions encoded in each of the blocks are identified by an identifier of the EV of the user or other unique identifiers such as a credit card account number of the EV user, an RFID associated with EV user, and the like. The encoded EV user actions in a block of the chain may include information describing charging of the EV at the apparatus 14, supplying electrical energy from the battery of the EV to the apparatus 14, detection of an EV leaving a location of a specific apparatus 14, and detecting an EV relocating to apparatus 14. The encoding of the EV user actions of charging the EV from an apparatus 14 may have a negative value, such that the digital coin value for the chain, in other words, the value of the digital coin associated or owned by the EV user, is decreased, based on the EV charging. In one embodiment, any EV user action that is deemed to create a positive value outcome may have a positive value for purposes of encoding the EV user action in the chain. In addition, the encoding of EV user action, for example, such as supplying energy from the EV to the charging apparatus 14 for supply to the grid or storage or another user, may have a positive value, such that the digital coin value for the digital coin is increased based on the EV charging. In another embodiment, the encoding of EV user action of: the user watching the target advertisement as indicated by the advertisement delivery information, or the user moving his EV vehicle from a first apparatus 14 to a second apparatus 14 based on supplemental charging instruction received while the EV vehicle is being charged at the first apparatus, may have a positive value, such that the digital coin value is increased upon creation of the corresponding block in the chain. In still another embodiment, the encoding of EV user action of: the user responding to a utility demand response command to stop or re-schedule EV charging activities, using energy produced by renewable sources, traveling with the EV to a proposed location for EV charging, such a specific parking spot in a specific parking lot, avoiding or foregoing EV charging at specific parking lots at given times, and the like, may have a positive value, such that the digital coin value for the digital coin is increased upon creation of the corresponding block in the chain.

In one embodiment, any EV user action that may be predetermined to create a negative value outcome may have a negative value for purposes of encoding the EV user action in the chain. In one embodiment, the cloud system may facilitate trading of the digital coins of the respective EV users in a marketplace, where a marketplace valuation of the digital coin may be a multiplier of the sum of the coin value encoded in the chain of the digital coin. In another embodiment, the cloud system may facilitate exchange of the digital coins with other currencies and serve as a clearinghouse for completing transactions involving purchase of goods and services with the digital coins, where the goods and services are offered for sale using another currency, which may include another digital currency.

In some embodiments, the goods and services of a third party may be accessed for purchase using the digital coins or energy credits of an EV user, by use of an application of the third party that may be executed at an EV charging apparatus, by communicatively linking to a website of the third party from the EV charging apparatus, and/or by use of an app on a smartPhone, tablet or like device of the EV user associated with managing and/or displaying events or actions performed during or related to an EV charging process. The application or the website, or the app on the smartphone or tablet, may provide for e-commerce transactions to be executed between the EV user and the third party. For example, the EV charging apparatus may provide for display of a screen display which includes indicia for opening an application or linking to a website associated with the third party, where at least one product or service is available for purchase from the third party via the application or the website. In addition, the EV charging apparatus may transmit, over the communication network, to a management server, such as an advertisement server, the controller 12 or a server in a cloud system, transaction information describing a purchase activity by the EV user at the application or the website. Further, the management server may credit an energy credit or digital currency account of the EV user a predetermined amount based on the transaction information. For example, the transaction information may indicate a credit is to be applied to the energy credit or digital currency account, where the credit may be provided based on the EV user simply accessing the application or website, or when the EV user purchases a predetermined product or service using the application or website. The energy credit or the digital currency account of the EV user, in addition, may be (i) credited in accordance with supply of electrical power from the EV of the EV user to an EV charging apparatus or another energy storage device and (ii) debited in accordance with charging of the EV of the EV user by an EV charging apparatus. In another embodiment, the transaction information may be provided to the management server from a computing device of the EV user or a server associated with the third party.

In an exemplary implementation of the present disclosure, referring to FIG. 1, an EV 16 may send a charging request to the controller 12. The controller 12, based on advertisement information received from an advertisement server stored in a memory, may determine a target advertisement matching the profile of the user of the EV 16. In addition, the controller 12 may select a particular slot of a parking lot at which a selected EV charging apparatus 14 is located for charging the EV 16, and create a power charging schedule for charging the EV 16 by the selected EV charging apparatus 14. The EV charging apparatus 14 may be selected in view of EP information, where the selection optimizes charging from available power sources at a minimum cost and in consideration of other power needs on a power grid. The controller 12 may then transmit the target advertisement with charging instructions indicating a power charging schedule for the EV 16 to the selected apparatus 14, and also transmit to the EV 16 the charging instructions indicating the location of the selected apparatus 14. The EV 16, in turn, may use the location information in a navigation application to provide for routing the EV 16 to the selected apparatus 14. The selected apparatus 14 desirably has the target advertisement stored in its memory and available for display before the EV 16 is detected as being present at the selected apparatus 14. When the selected apparatus 14 detects that the EV 16 is present, for example, the apparatus 14 is accessed for charging such as indicated by a physical connection of the electric power cable of the apparatus 14 with the EV 16 which is detected using suitable cable connection detection technology, the apparatus 14 causes the display 240 or an associated display device to display the target advertisement. The apparatus 14 monitors display of the target advertisement and whether the driver or others (e.g., users of the EV) are viewing the display during display of the target advertisement, and, based on the monitoring, generates and stores monitoring information that, for example, indicates a length of time the user(s) viewed the target advertisement while it was being displayed. Advertising delivery information, generated based on the monitoring information, is transmitted from the apparatus 14 to the controller 12, and indicates identity of the user(s) who viewed the display while the target advertisement was displayed and timing information concerning time length of the user viewing of the display. The controller 12, based on the advertisement delivery information, may generate and store log information for use in determining fees to be paid by advertisers based on display of the advertisements thereof targeted to specific users at the apparatuses 14.

In one embodiment, referring to FIG. 1, the display of the EV charging apparatus may be used as a so-called message wall on which messages for or from others may be left, by execution of a display message application stored at the EV charging apparatus 14. In another embodiment, the EV charging apparatus may be operable to provide for texting, or communication using a social media application, via the display 240 of the EV charging apparatus, over a communication link established with a Wi-Fi communication device 350 having a communication coverage area extending to the communication device 220 of the EV charging apparatus 14.

Most of the foregoing alternative examples are not mutually exclusive, but may be implemented in various combinations to achieve unique advantages. As these and other variations and combinations of the features discussed above may be utilized without departing from the subject matter defined by the paragraphs, the foregoing description of the embodiments should be taken by way of illustration rather than by way of limitation of the subject matter defined by the paragraphs. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the paragraphs to the specific examples; rather, the examples are intended to illustrate only one of many possible embodiments. Further, the same reference numbers in different drawings may identify the same or similar elements.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method for charging a battery of a mobile energy storage and power consumption device installed on an electric vehicle (EV) at a selected EV charging apparatus among a plurality of EV charging apparatuses, the method comprising:
   controlling, by a processing device of a server remote from the EV charging apparatuses,
   determining, from advertisement information, a target advertisement in accordance with (i) identification information identifying the EV, wherein the identification information identifying the EV is determined based on one or more images of the EV acquired by an image sensor and a processor of the selected EV charging apparatus, (ii) profile information for the EV or at least one user of the EV, and (iii) advertisement characteristic information included in the advertisement information and corresponding to the target advertisement;
   when information indicating charging of the battery of the mobile energy storage and power consumption device of the EV is to be performed at the selected EV charging apparatus is determined, transmitting, over the communication network, target advertisement information indicating the target advertisement and with identification information including at least one of an identifier of the selected EV charging apparatus or an identifier of a wireless communication device of the at least one user, to cause display of the target advertisement at a display of the selected EV charging apparatus;
   receiving, over the communication network, from at least one of the selected EV charging apparatus or the wireless communication device of the at least one user, advertisement delivery information indicating when the mobile energy storage and power consumption device is at or connected by an electric power cable with the selected EV charging apparatus, identity of the EV and the at least one user, and information describing rendering of the target advertisement on the display of the selected EV charging apparatus;
   encoding the advertisement delivery information as an encoded first block in a chain including a second encoded block of information describing charging of the EV of the at least one user at the selected EV charging apparatus, in which the encoded first block is encoded based on the second encoded block, and information encoded in each block of the chain includes an identifier of the EV or the at least one user of the EV associated with the information encoded; and
   encoding, for each block of the chain, a digital coin value which is a sum of a digital coin value indicated in an adjacent prior block in the chain and a value corresponding to the information encoded in the block, wherein:
   the value corresponding to the information encoded in the block is a positive value when the information encoded corresponds to: energy being supplied from the EV to the selected EV charging apparatus, the at least one user watching the target advertisement as indicated by the advertisement delivery information, the at least one user relocating the EV to another EV charging apparatus based on a utility demand command, the at least one user responding to a utility demand response command to stop or re-schedule EV charging, the charging from the selected EV charging apparatus being based on energy produced by a renewable energy source, the at least one user traveling with the EV to a predetermined location for EV charging, the at least one user not performing EV charging at a predetermined EV charging apparatus at a predetermined time, or a predetermined action of the at least one user or relating to the EV which is deemed to create a positive value outcome; and a negative value when the information encoded corresponds to: charging of the EV from the selected EV charging apparatus and other actions that can be deemed as the negative value creation or a predetermined action of the at least one user or relating to the EV which is deemed to create a negative value outcome.

2. The method of claim 1, wherein the wireless communication device is a smart phone or tablet.

3. The method of claim 1, wherein the target advertisement information is transmitted according to a request for charging of the EV from the at least one user received over the communication network, such that the target advertisement is received at the at least one of the selected EV charging apparatus or the wireless device before an expected start time of charging of the battery of the mobile energy storage and power consumption device of the EV at the selected EV charging apparatus.

4. The method of claim 1, wherein the target advertisement information is transmitted according to a predictive pattern of arrival and departure of the at least one user from a home of the at least one user at which the selected EV charging apparatus is located.

5. The method of claim 1, further comprising:
controlling, by the processing device,
receiving, over the communication network, the advertisement information.

6. The method of claim 1, wherein the advertisement delivery information includes sensor related information indicating a time period the at least one user viewed the target advertisement on the at least one display.

7. The method of claim 6, wherein the sensor related information is based on image data from a camera of the selected EV charging apparatus obtained from imaging a vicinity including the at least one display.

8. The method of claim 6, further comprising:
controlling, by the processing device, determining from the sensor related information a time period the at least one user viewed the target advertisement on the at least one display.

9. The method of claim 1, further comprising:
controlling, by the processing device,
receiving, over the communication network, a request for charging from the mobile energy storage and power consumption device of the EV;
determining the selected EV charging apparatus from among the plurality of EV charging apparatuses for charging of the battery of the EV and an expected time for the charging, according to charging availability information indicating current and expected charging operating status respectively for the plurality of EV charging apparatuses and information indicating location of the EV received over the communication network; and transmitting, over the communication network, charging instructions to the mobile energy storage and power consumption device indicating the selected EV charging apparatus,
wherein the target advertisement information is transmitted when the charging instructions are transmitted.

10. The method of claim 9, wherein the charging instructions indicate location of a slot in a parking lot at which the selected EV charging apparatus is located.

11. The method of claim 1, further comprising:
controlling, by the processing device, based on the advertisement delivery information, storing in a memory log information indicating a number of times and times when the target advertisement is displayed at a given EV charging apparatus or a given computing device and identity of at least one of the given EV charging apparatus or a given user of the given EV charging apparatus.

12. The method of claim 11, further comprising:
controlling, by the processing device, transmitting the log information, over the communication network, to an external apparatus associated with the advertisement information; and
receiving, over the communication network, payment information determined based on the log information.

13. The method of claim 12, further comprising:
controlling, by the processing device, determining from the payment information an allocation amount of advertiser fees to credit towards an operating cost of the selected EV charging apparatus, in which the operating cost includes cost of obtaining communication network services for the selected EV charging apparatus.

14. The method of claim 12, further comprising:
controlling, by the processing device, determining from the payment information an allocation amount of advertiser fees to credit towards cost of electrical energy supplied by the selected EV charging apparatus for charging the EV.

15. The method of claim 14, wherein the allocation amount is based on a determination of length of time a given advertisement of a given advertiser displayed at the at least one display was viewed by the at least one user.

16. The method of claim 1, further comprising:
controlling, by the processing device, receiving second advertisement delivery information indicating display of a supplemental advertisement of a second advertiser transmitted to the selected EV charging apparatus responsive to a supplemental advertisement request by the at least one user input at the at least of the display.

17. The method of claim 16, further comprising:
controlling, by the processing device, determining an allocation amount of advertiser fees of the second advertiser to be credited towards cost of electrical energy supplied by the selected EV charging apparatus for charging the EV, based on the second advertisement delivery information.

18. The method of claim 1, further comprising:
controlling, by the processing device, transmitting selected advertisement information including a selected advertisement to the wireless communication device of the at least one user, in response to a selected advertisement request from the selected EV charging apparatus for transmission of the selected advertisement content to the wireless communication device of the at least one user, wherein the selected advertisement content is transmitted in accordance with the profile information for the at least one user.

19. The method of claim 1, further comprising:
controlling, by the processing device, transmitting, to the selected EV charging apparatus, value information for respective advertisement content available for transmission to the wireless communication device of the at least one user, in which the value information is transmitted to cause display on the display of the wireless communication device the value information with corresponding advertisement content indicated as available for transmission to the wireless communication device.

20. The method of claim 1 further comprising:
controlling, by the processing device,
updating an energy credit or digital currency account of the at least one user, in which the energy credit or the digital currency account is (i) credited in accordance with supply of electrical power from the battery of the mobile energy storage and power consumption device of the EV to one of the plurality of EV charging apparatuses or another energy storage device and (ii) debited in accordance with charging of the battery of the mobile energy storage and power consumption device of the EV by any of the plurality of EV charging apparatuses; and
displaying a screen display at the at least one display including indicia for opening an application or linking to a website associated with another entity, in which at least one product or service is available for purchase from the another entity by the at least one user via the application or the website,
wherein the updating of the energy credit or the digital currency account of the at least one user includes crediting or debiting a predetermined amount thereto, in accordance with transaction information describing a purchase activity by the at least one user at the application or the website.

21. The method of claim 20, further comprising:
controlling, by the processing device, receiving, over the communication network, the transaction information from the selected EV charging apparatus, the wireless communication device, or a server associated with the application or the website of the another entity.

22. A method for charging a battery of a mobile energy storage and power consumption device installed on an electric vehicle (EV) at a selected EV charging apparatus among a plurality of EV charging apparatuses, the method comprising:
controlling, by a processing device of a server remote from the EV charging apparatuses,
determining a target content in accordance with (i) identification information identifying the EV, wherein the identification information identifying the EV is determined based on one or more images of the EV acquired by an image sensor and a processor of the selected EV charging apparatus, and (ii) profile information for the EV or at least one user of the EV;
when information indicating charging of the battery of the mobile energy storage and power consumption device of the EV is to be performed at the selected EV charging apparatus is determined, transmitting, over the communication network, target content information indicating the target content and with identification information including at least one of an identifier of the selected EV charging apparatus or an identifier of a wireless communication device of the at least one user, to cause display of the target content at a display of the selected EV charging apparatus
receiving, over the communication network, from at least one of the selected EV charging apparatus or the wireless communication device of the at least one user, content delivery information indicating when the mobile energy storage and power consumption device is at or connected by an electric power cable with the selected EV charging apparatus, identity of the EV or the at least one user, and information describing rendering of the target content on the display of the selected EV charging apparatus;
encoding the advertisement delivery information as an encoded first block in a chain including a second encoded block of information describing charging of the EV of the at least one user at the selected EV charging apparatus, in which the encoded first block is encoded based on the second encoded block, and information encoded in each block of the chain includes an identifier of the EV or the at least one user of the EV associated with the information encoded; and
encoding, for each block of the chain, a digital coin value which is a sum of a digital coin value indicated in an adjacent prior block in the chain and a value corresponding to the information encoded in the block,
wherein:
the value corresponding to the information encoded in the block is a positive value when the information encoded corresponds to: energy being supplied from the EV to the selected EV charging apparatus, the at least one user watching the target advertisement as indicated by the advertisement delivery information, the at least one user relocating the EV to another EV charging apparatus based on a utility demand command, the at least one user responding to a utility demand response command to stop or re-schedule EV charging, the charging from the selected EV charging apparatus being based on energy produced by a renewable energy source, the at least one user traveling with the EV to a predetermined location for EV charging, the at least one user not performing EV charging at a predetermined EV charging apparatus at a predetermined time, or a predetermined action of the at least one user or relating to the EV which is deemed to create a positive value outcome; and
a negative value when the information encoded corresponds to: charging of the EV from the selected EV charging apparatus and other actions that can be deemed as the negative value creation or a predetermined action of the at least one user or relating to the EV which is deemed to create a negative value outcome.

* * * * *